C. R. James,
Cutting Wooden Gearing.
N° 49,881.    Patented Sep. 12, 1865.
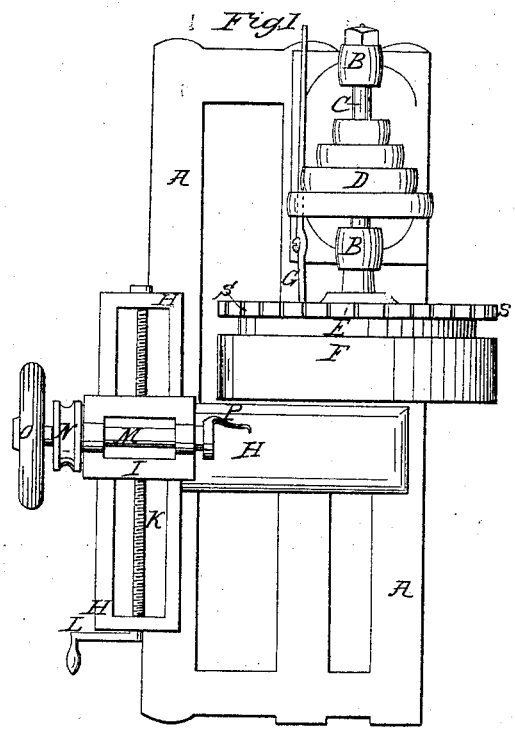
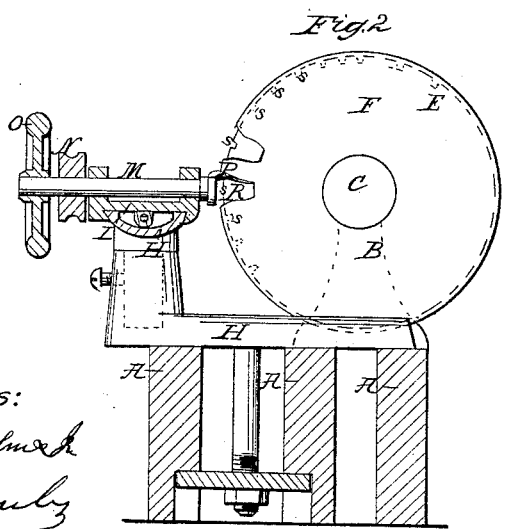
Witnesses:
Lawrence Holmes
J. W. Coombs
Inventor:
C R James

UNITED STATES PATENT OFFICE.

CHRISTOPHER R. JAMES, OF JERSEY CITY, NEW JERSEY.

IMPROVEMENT IN MACHINES FOR CUTTING WOOD GEAR.

Specification forming part of Letters Patent No. 49,881, dated September 12, 1865.

*To all whom it may concern:*

Be it known that I, CHRISTOPHER R. JAMES, of Jersey City, in the county of Hudson and State of New Jersey, have invented a new and useful Improvement in Machinery for Cutting the Teeth of Wooden Gear-Wheel Patterns; and I do hereby declare that the following is a full, clear, and exact description of the same, reference being had to the accompanying drawings, forming part of this specification, in which—

Figure 1 is a plan of a machine with my improvement. Fig. 2 is an end elevation.

The same letters of reference designate the same part of the machine in both figures.

The nature of my invention consists in an improvement in machinery for cutting the teeth of wooden gear-wheel patterns, by use of which much time is saved and perfect uniformity of the teeth and spaces is obtained without the necessity of marking them out before cutting.

To enable others skilled in the art to make and use my invention, I will proceed to describe its construction and operation.

I provide a suitable horizontal frame-work, A, like the bed of a lathe, upon one end of which I place proper standards B, to support a mandrel or spindle, C, with pulleys D, and a dividing-plate, E, like the face-plate of a lathe, the said plate being constructed in such a manner that a wooden blank-wheel, F, can be firmly attached to it, and by means of a stop, G, entering one of a circular series of equidistant notches, s s, corresponding in number with the intended number of teeth to be cut in the gear-wheel pattern, may be held in any required position. I further provide upon the frame-work or bed-plate A an adjustable support, H, having a sliding tool-carriage, I, which can be moved forward and back in a line parallel with the axis of the dividing-plate spindle C, and for this purpose being provided with a screw, K, and crank L. The sliding piece I carries a spindle, M, placed at right angles with the dividing-plate spindle C, with the axes of both spindles in one plane. To the outer end of the spindle M I attach a small pulley, N, and a small fly-wheel, O, and to the inner end I affix a cutter, P, by means of a screw, or in any other suitable way. This cutter P is made with a sharp cutting-edge, like a knife, and of a form corresponding exactly with the profile shape of one side of a tooth intended to be cut and one-half part of the space between two teeth.

Operation: The different parts having been constructed as described and properly adjusted, a wooden blank-wheel, F, is attached to the dividing-plate E. The said plate is secured by placing the stop G in one of its notches s s. A belt is put around the pulley N and around a pulley which may be set in motion by steam or any other suitable power. Then, by rotary motion being imparted to the cutter P, while the latter is brought in contact with the wooden blank-wheel and gradually advanced across the periphery thereof by means of the screw K, the cutter P will cut out the space R between two teeth, as shown in Fig. 2.

After one space has been cut out, then the cutter is withdrawn, the stop G removed from the notch s, the dividing-plate E is turned around to the distance of one notch s, and the stop G applied therein, and the same operation is gone through as with the cutting out of the first space, and the operation is repeated till the teeth and spaces have been cut all around the pattern.

It is necessary to set the cutter-spindle M with care, so that the axis of the spindle C and the axis of the spindle M shall be in one plane, in order to have the teeth stand in a proper position and not lean toward one side. A one-edged cutter, made as described and attached to a spindle thus set, will cut the teeth more accurately than can be done by any other method, as one and the same cutting-edge shapes both sides of the tooth, and does it in one operation. It also saves a great deal of time, as it dispenses with the laying out the teeth and cutting and shaping them by hand, or having each tooth inserted into the wheel separately, as has been done heretofore.

The cutter P will require to be changed for one of a different size and form to cut teeth having a wider or narrower space between them or of a different form.

Having thus fully described my invention, what I claim therein as new, and desire to secure by Letters Patent of the United States, is—

The arrangement of the sliding cutter-carriage, the revolving cutter-stock M and cutter P, and the revolving dividing-plate E, substantially as and for the purpose herein specified.

C. R. JAMES.

Witnesses:
LANCE HOLMES, Jr.,
GEO. W. REED.